(12) United States Patent
Breternitz et al.

(10) Patent No.: US 8,782,645 B2
(45) Date of Patent: Jul. 15, 2014

(54) AUTOMATIC LOAD BALANCING FOR HETEROGENEOUS CORES

(75) Inventors: Mauricio Breternitz, Austin, TX (US);
Patryk Kaminski, Austin, TX (US);
Keith Lowery, Bothell, WA (US);
Anton Chernoff, Harvard, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 206 days.

(21) Appl. No.: 13/105,250

(22) Filed: May 11, 2011

(65) Prior Publication Data
US 2012/0291040 A1 Nov. 15, 2012

(51) Int. Cl.
*G06F 9/46* (2006.01)
*G06F 9/50* (2006.01)

(52) U.S. Cl.
CPC ................................... *G06F 9/5083* (2013.01)
USPC ........... 718/100; 718/102; 718/104; 718/105; 718/108

(58) Field of Classification Search
None
See application file for complete search history.

(56) References Cited

U.S. PATENT DOCUMENTS

| | | | |
|---|---|---|---|
| 6,078,944 A | 6/2000 | Enko et al. | |
| 6,298,477 B1 * | 10/2001 | Kessler | 717/145 |
| 6,345,041 B1 | 2/2002 | Kimball et al. | |
| 6,480,930 B1 | 11/2002 | Zakai et al. | |
| 6,560,717 B1 | 5/2003 | Scott et al. | |
| 7,437,581 B2 * | 10/2008 | Grochowski et al. | 713/320 |
| 8,312,455 B2 * | 11/2012 | Bell et al. | 718/100 |
| 2002/0147969 A1 * | 10/2002 | Lethin et al. | 717/138 |
| 2004/0168039 A1 * | 8/2004 | Park | 712/1 |
| 2005/0251667 A1 * | 11/2005 | Iwamoto | 712/233 |
| 2007/0283358 A1 * | 12/2007 | Kasahara et al. | 718/104 |
| 2009/0165014 A1 * | 6/2009 | Park | 718/105 |
| 2009/0193231 A1 * | 7/2009 | Gschwind et al. | 712/205 |
| 2009/0222654 A1 * | 9/2009 | Hum et al. | 713/100 |
| 2009/0313507 A1 * | 12/2009 | Swaine et al. | 714/38 |
| 2010/0077236 A1 * | 3/2010 | Trautman et al. | 713/300 |

(Continued)

OTHER PUBLICATIONS

Vactor J Jima CR Nez et al: 11 Predictive Runtime Code Scheduling for Heterogeneous Architectures 11 Jan. 25, 2089 (Jan. 25, 2889), Fourth International Conference on High-Performance Embedded Architectures and Compilers (HIPEAC 2809). Paphos, Cyprus, January 25-28, 2009, Springer, DE, pp. 19-33, XP819114340, ISBN: 978-3-548-92989-5.

Howard Jay Siegel et al: 11 Software support for heterogeneous computing 11 ACM Computing Surveys vol. 28, No. 1! Mar. 1, 1996 pp. 237-239 XP55033939 ISSN: 0360-0300 DOI: 10.1145/234313. 234411.

Pekka 0 Jaskelainen et al: 11 OpenCL-based design methodology for application-specific processors 11, Embedded Computer Systems (SAMOS), 2010 International Conference on! IEEE, Piscataway, NJ, USA, Jul. 19, 2010, pp. 223-230, XP031806001, ISBN: 978-1-4244-7936-8.

International Search Report and Written Opinion in application No. PCT/US2012/037433 mailed Aug. 6, 2012.

*Primary Examiner* — Charles Swift
(74) *Attorney, Agent, or Firm* — Rory D. Rankin; Meyertons, Hood, Kivlin, Kowert & Goetzel, P.C.

(57) ABSTRACT

A system and method for efficient automatic scheduling of the execution of work units between multiple heterogeneous processor cores. A processing node includes a first processor core with a general-purpose micro-architecture and a second processor core with a single instruction multiple data micro-architecture. A computer program comprises one or more compute kernels, or function calls. A compiler computes pre-runtime information of the given function call. A runtime scheduler produces one or more work units by matching each of the one or more kernels with an associated record of data. The scheduler assigns work units either to the first or to the second processor core based at least in part on the computed pre-runtime information. In addition, the scheduler is able to change an original assignment for a waiting work unit based on dynamic runtime behavior of other work units corresponding to a same kernel as the waiting work unit.

15 Claims, 9 Drawing Sheets

(56) References Cited

U.S. PATENT DOCUMENTS

2010/0153959 A1* 6/2010 Song et al. .................... 718/104
2011/0099542 A1* 4/2011 Branda et al. ................. 717/154
2011/0213934 A1* 9/2011 Greenhalgh et al. .......... 711/146
2011/0246998 A1* 10/2011 Vaidya et al. ................. 718/103
2012/0079501 A1* 3/2012 Sandstrom .................... 718/105

* cited by examiner

```
                                          Code 210
void DoWorkA(Record * record)
{
    // perform steps of a first algorithm
    // on the record
} void DoWorkB(Record * record)
{
    // perform steps of a second algorithm
    // on the record
} void KernelFunction(Record * recordsArray)
{
    const int unitId = get_global_Id(0);

DoWorkA(&recordsArray[unitId]);

DoWorkB( &recordsArray[unitId]);
}
```

```
                    Code 220

INPUT = [1, 3, 2, 7, 8,
         1, 3, 5, 2, 4]

KERNEL Power2(INPUT,
RESULT) {
    N = get_array_index();
    V = INPUT[N];
    RESULT[N] = V * V;
}
```

*FIG. 2*

```
                                                    Code 230
void DoWorkA(Record * record)
{
    // perform steps of a  first algorithm
    // on the record
} void DoWorkB(Record * record)
{
    // perform steps of a  second algorithm
    // on the record
} void KernelFunction(Record * recordsArray)
{
    const int unitId = get_global_Id(0);
    If (EvaluateFunction(recordsArray[unitId])
    {
        DoWorkA(&recordsArray[unitId]);
    }
    else
    {
        DoWorkB( &recordsArray[ unitId]);
    }
}
```

*FIG. 3*

AUTOMATIC LOAD BALANCING FOR HETEROGENEOUS CORES

BACKGROUND OF THE INVENTION

1. Field of the Invention

This invention relates to computing systems, and more particularly, to automatically scheduling the execution of work units between multiple heterogeneous processor cores.

2. Description of the Relevant Art

The parallelization of tasks is used to increase the throughput of computer systems. To this end, compilers or the software programmer may extract parallelized tasks from program code to execute in parallel on the system hardware. With a single-core architecture, a single core may include deep pipelines and multiple execution contexts configured to perform multi-threading. To further increase parallel execution on the hardware, a multi-core architecture may include multiple processor cores. This type of architecture may be referred to as a homogeneous multi-core architecture and may provide higher instruction throughput than a single-core architecture. However, particular instructions for a computationally intensive task may consume a disproportionate share of a shared resource, which may in turn delay the deallocation of the shared resource. Examples of such specific tasks may include cryptography, video graphics rendering, and garbage collection.

To overcome the performance limitations of conventional general-purpose cores, a computer system may offload specific tasks to special-purpose hardware. This hardware may include a single instruction multiple data (SIMD) parallel architecture, a field-programmable gate array (FPGA), and/or other specialized types of processing cores. When an architecture includes multiple cores of different types it may be referred to as a heterogeneous multi-core architecture.

Presently, an operating system (OS) scheduler or a user-level scheduler, which may also be referred to as a "scheduler", may schedule workloads running on a computer system with a heterogeneous multi-core architecture using a variety of schemes—such as a round-robin scheme. Additionally, an scheduler may schedule these workloads based on availability of the cores. Alternatively, a programmer may schedule the workloads in combination with the runtime system. In such a case, the programmer may utilize a software platform to perform the scheduling. For example, the OpenCL® (Open Computing Language) framework supports programming across heterogeneous computing environments and includes a low-level application programming interface (API) for heterogeneous computing. The OpenCL framework (generally referred to herein as "OpenCL") includes a C-like language interface that may be used to define execution queues, wherein each queue is associated with an OpenCL device. An OpenCL device may be a CPU, a GPU, or other unit with at least one processor core within the heterogeneous multi-core architecture. In the OpenCL framework a function call may be referred to as an OpenCL compute kernel, or simply a "compute kernel". A software programmer may schedule the compute kernels in the execution queues. A compute kernel may be matched with one or more records of data to produce one or more work units of computation. Each work unit may have a unique identifier (ID).

The scheduling model described above may restrict portability and performance when there is a mismatch between the scheduling schemes and system resources. The programmer may trade portability for efficiency while attempting to provide an application that spans varied system configurations.

SUMMARY OF EMBODIMENTS OF THE INVENTION

Systems and methods for performing efficient automatic scheduling of the execution of work units between multiple heterogeneous processor cores are contemplated.

In one embodiment, a processing node includes a first processor core with a first micro-architecture and a second processor core with a second micro-architecture different from the first micro-architecture. In one embodiment, the first micro-architecture is a general-purpose micro-architecture and the second micro-architecture is a single instruction multiple data (SIMD) micro-architecture. The processing node includes a memory coupled to each of the first and the second processor cores. The memory stores a computer program comprising one or more compute kernels, or function calls. As a compiler traverses the instructions of a given function call, the compiler is configured to compute pre-runtime information of the given function call. A scheduler within an operating system (OS) produces one or more work units by matching each of the one or more kernels with an associated record of data. The scheduler also assigns the one or more work units either to the first processor core or to the second processor core based at least in part on the computed pre-runtime information. In addition, the scheduler is able to change an original assignment for a waiting work unit from either the first or the second processor core to the other processor core based on dynamic runtime behavior of other work units corresponding to a same kernel as the waiting work unit.

These and other embodiments will be further appreciated upon reference to the following description and drawings.

BRIEF DESCRIPTION OF THE DRAWINGS

FIG. 2 is a generalized block diagram of one embodiment of source code defining compute kernels.

FIG. 3 is a generalized block diagram of one embodiment of source code defining compute kernels with conditional statements.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 1:
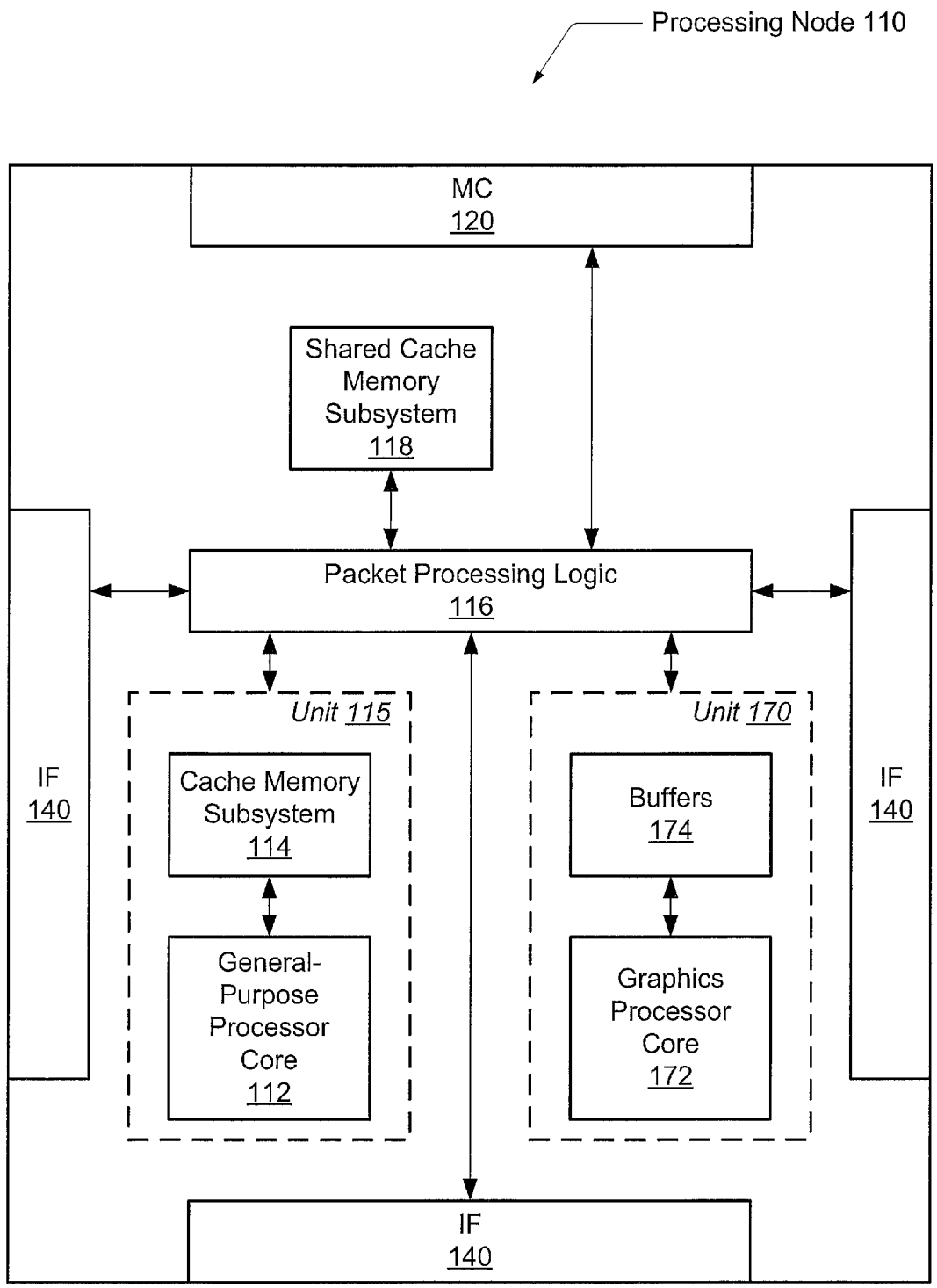
FIG. 1 is a generalized block diagram of one embodiment of an exemplary processing node with a heterogeneous multi-core architecture.

Referring to FIG. 1, one embodiment of an exemplary processing node 110 with a heterogeneous multi-core architecture is shown. Processing node 110 may include one or more processing units 115, which may include one or more processor cores 112 and an associated cache memory subsystem 114. In one embodiment, processor core 112 utilizes a general-purpose micro-architecture.

Processing node 110 may also include one or more processing units 170, which may comprise one or more processor cores 172 and data storage buffers 174. Processor core 172 may not be a mirrored silicon image of processor core 112. Processor core 172 may have a micro-architecture different from the micro-architecture used by processor core 112. In one embodiment, the processor core 172 may be a different generation of a same processor family as processor core 112. In another embodiment, the processor core 172 may be a voltage and/or frequency scaled version of processor core 112. In other words, the processor core 172 is not a silicon copy of the processor core 112 with a same functionality and instruction set architecture (ISA), a same clock frequency, same cache sizes, a same memory model, and so forth.

Continuing with the micro-architecture of processor core 172, in yet another embodiment, the processor core 172 may comprise a micro-architecture that provides high instruction throughput for a computational intensive task. Processor core 172 may have a parallel architecture. For example, the processor core 172 may be a single instruction multiple data (SIMD) core. Examples of SIMD cores include graphics processing units (GPUs), digital signal processing (DSP) cores, or other. In one embodiment, the processing node 110 comprises a single instruction set architecture (ISA). Typically, as is well known in the art, single-ISA multi-core architectures have been shown to provide higher power and throughput performances for chip multiprocessors (CMP).

High instruction throughput on processing node 110 may be achieved with measured power consumption within a given power limit when threads of software applications are efficiently scheduled. The threads may be scheduled on one of processor cores 112 and 172 in a manner that each thread has the highest instruction throughput based at least in part on the runtime hardware resources of the processor cores 112 and 172.

Continuing with the components in the processing node 110, the processing node 110 may include memory controller 120, and interface logic 140. In one embodiment, the illustrated functionality of processing node 110 is incorporated upon a single integrated circuit. In one embodiment, processor cores 112 include circuitry for executing instructions according to a predefined general-purpose instruction set. For example, the SPARC® instruction set architecture (ISA) may be selected. Alternatively, the x86, x86-64®, Alpha®, PowerPC®, MIPS®, PA-RISC®, or any other instruction set architecture may be selected. Generally, processor core 112 accesses the cache memory subsystems 114, respectively, for data and instructions. If the requested block is not found in cache memory subsystem 114 or in shared cache memory subsystem 118, then a read request may be generated and transmitted to the memory controller within the node to which the missing block is mapped.

In one embodiment, processing unit 170 is a graphics processing unit (GPU). Modern GPUs are very efficient at manipulating and displaying computer graphics. The highly parallel structure of GPUs makes them more effective than general-purpose central processing units (CPUs), such as processing unit 115, for a range of complex algorithms. Typically, a GPU executes calculations used for graphics and video and a CPU executes calculations for many more system processes than graphics alone. Conventional GPUs utilize very wide single instruction multiple data (SIMD) architectures to achieve high throughput in image-rendering applications. Such applications generally entail executing the same programs, such as vertex shaders or pixel shaders, on large numbers of objects (vertices or pixels). Since each object is processed independently of other objects, but the same sequence of operations is used, a SIMD architecture provides considerable performance enhancement. GPUs have also been considered for non-graphical calculations.

In one embodiment, the GPU 170 may be located on a video card. In another embodiment, the GPU 170 may be integrated on the motherboard. In yet another embodiment, the illustrated functionality of processing node 110 may be incorporated upon a single integrated circuit. In such an embodiment, the CPU 115 and the GPU 170 may be proprietary cores from different design centers. Also, the GPU 170 may now be able to directly access both local memories 114 and 118 and main memory via memory controller 120 from the processing node 110, rather than perform memory accesses off-chip via interface 140. This embodiment may lower latency for memory accesses for the GPU 170, which may translate into higher performance.

Continuing with the components of processing node 110 in FIG. 1, cache subsystems 114 and 118 may comprise high-speed cache memories configured to store blocks of data. Cache memory subsystems 114 may be integrated within respective processor cores 112. Alternatively, cache memory subsystems 114 may be coupled to processor cores 114 in a backside cache configuration or an inline configuration, as desired. Still further, cache memory subsystems 114 may be implemented as a hierarchy of caches. Caches that are located nearer processor cores 112 (within the hierarchy) may be integrated into processor cores 112, if desired. In one embodiment, cache memory subsystems 114 each represent L2 cache structures, and shared cache subsystem 118 represents an L3 cache structure. Both the cache memory subsystem 114 and the shared cache memory subsystem 118 may include a cache memory coupled to a corresponding cache controller.

Generally, packet processing logic 116 is configured to respond to control packets received on the links to which processing node 110 is coupled, to generate control packets in response to processor cores 112 and/or cache memory subsystems 114, to generate probe commands and response packets in response to transactions selected by memory controller 120 for service, and to route packets for which node 110 is an intermediate node to other nodes through interface logic 140. Interface logic 140 may include logic to receive packets and synchronize the packets to an internal clock used by packet processing logic 116.

Tuning now to FIG. 2, one embodiment of source code utilizing compute kernels is shown. OpenCL™ (Open Computing Language) is one example of an application programming interface (API) for heterogeneous computing. OpenCL includes a C-like language interface that defines execution queues, wherein each queue is associated with an OpenCL device. An OpenCL device may be a CPU, a GPU, or other unit with at least one processor core within the heterogeneous multi-core architecture. A function call may be referred to as an OpenCL kernel, or simply a "compute kernel". The OpenCL framework may improve computing performance for a wide variety of data-parallel applications used in gaming, entertainment, science and medical fields. For a heterogeneous architecture, a computer program typically comprises a collection of compute kernels and internal functions. A software programmer may define the compute kernels, whereas the internal functions may be defined in a given library.

For a data-parallel software application, an N-Dimensional computation domain may define an organization of an "execution domain". The N-Dimensional computation domain may also be referred to as an N-Dimensional grid or an N-Dimensional Range ("NDRange"). The NDRange may be a one-, two-, or three-dimensional space. This dimensional space may also be referred to as an index space. For example, a software application may perform data processing on a two-dimensional (2D) array of data, such as an image file. The software application may perform an algorithm developed by a software programmer on a pixel-by-pixel basis of a 2D image. A given compute kernel may be invoked over the index space (the NDRange).

Typically after compilation, the arguments and parameters of each compute kernel are set. Additionally, associated memory objects and buffers are created. A given instance of the compute kernel may be executed as its own software thread. A given instance of the compute kernel at a given point in the index space may be referred to as a "work item". A work item may also be referred to as a work unit. A work unit may operate with the one or more instructions in the compute kernel on a record of data corresponding to a given pixel (a given index) of the 2D image. Typically, work units have an associated unique identifier (ID). In another example, an introductory computer program processing the string "Hello World" may have one work unit for computing each letter in the string.

The NDRange may define a total number of work units that execute in parallel if there is sufficient hardware support. For example, the NDRange may define a number of 280 work units, but a GPU may support the simultaneous execution of 64 work units at any given time. The total number of work units may define a global work size. As is well known to those skilled in the art, the work units may be further grouped into work groups. Each work group may have a unique identifier (ID). The work units within a given work group may be able to communicate with each other and synchronize execution and coordinate memory accesses. A number of work units may be clustered into a wave front for simultaneous execution on a GPU in a SIMD manner. Regarding the example above for 280 total work units, a wave front may include 64 work units.

The OpenCL framework is an open programming standard for various compute devices, or OpenCL devices. A software programmer may avoid writing a vendor-specific code, which may result in improved code portability. Other frameworks are available and may offer more vendor-specific coding for heterogeneous architectures. For example, NVIDIA offers Compute Unified Device Architecture (CUDA®) and AMD offers ATI Stream®. With a CUDA framework, a compute kernel is typically statically compiled when the computer program is compiled. With an OpenCL framework, a compute kernel is typically compiled with a Just-In-Time (JIT) method. The JIT method may generate an appropriate binary code after obtaining the system configuration. With a JIT compilation method, the compilation time is included with the total execution time. Therefore, compiler optimizations may increase the execution time. In addition, at run time the OpenCL compiler may generate multiple versions of compute kernels. One version of a compute kernel may be generated for each type of OpenCL device type, such as a general-purpose CPU, a SIMD GPU, and so forth.

The two frameworks, OpenCL and CUDA, have a difference in terminology between their respective execution models. For example, a work unit, a work group, a wave front and an NDRange in OpenCL have corresponding terms in CUDA such as a thread, a thread block, a warp and a grid. Throughout the rest of the description, the terms corresponding to OpenCL are used. However, the systems and methods described may apply to CUDA, ATI Stream and other frameworks.

As shown in FIG. 2, code 210 defines two function calls generally titled "doWorkA" and "doWorkB". Each function call may be referred to as a "compute kernel". A compute kernel may be matched with one or more records of data to produce one or more work units of computation. Therefore, two or more work units may utilize the same instructions of the single function call, but operate on different records of data. For example, the function call "Power2" in code 220 may be used to execute 10 work units, one for each data value in the array "INPUT". Here, a record comprises a single data value. In other examples, a record may comprise two or more fields, wherein each field includes a data value. A SIMD micro-architecture may efficiently execute the instructions of the kernel "Power2", calculate the power of 2 for the values in the INPUT array and write the output to the RESULT array.

The OpenCL framework may invoke an instance of a compute kernel multiple times in parallel. With a JIT compiling method, these instances are compiled at runtime to be later invoked. Each invocation (call) to the compute kernel has one associated unique ID (a work unit ID) that may be fetched by calling an internal function named get_global_id(0). Regarding the above example in code 220, the compute kernel "Power2" is invoked once for each data value in the INPUT array. In this case, the compute kernel "Power2" is invoked 10 times. Accordingly, ten unique work unit IDs are fetched. The OpenCL framework may differentiate between these different instances by utilizing the unique work unit IDs. The data to be operated on (a record) may also be specified, such as a specific data value in the INPUT array. Therefore, at runtime, a work unit may be scheduled by default to a same OpenCL device as the associated compute kernel is scheduled.

Turning now to FIG. 3, one embodiment of source code defining compute kernels with conditional statements is shown. Similar to code 210, the code 230 shown in FIG. 3 defines two function calls generally titled "doWorkA" and "doWorkB". Again, each function call may be referred to as a "compute kernel". Here, only one of the two compute kernels is executed during runtime. The selection of which compute kernel is executed is based on a conditional test provided by the function call "EvaluateFunction". A result of a given instruction or whether the given instruction is executed is data-dependent on the execution of previous instructions and data corresponding to an associated record. If the result of the conditional test is not consistent among a wave front of work units, the benefits of a SIMD micro-architecture may be reduced. For example, a given SIMD core may have 64 parallel computation units available for simultaneous execution of 64 work units. However, if half of the 64 work units pass the conditional test while the other half fails the conditional test, then only half of the parallel computation units are utilized during a given stage of processing.

Figure 4:
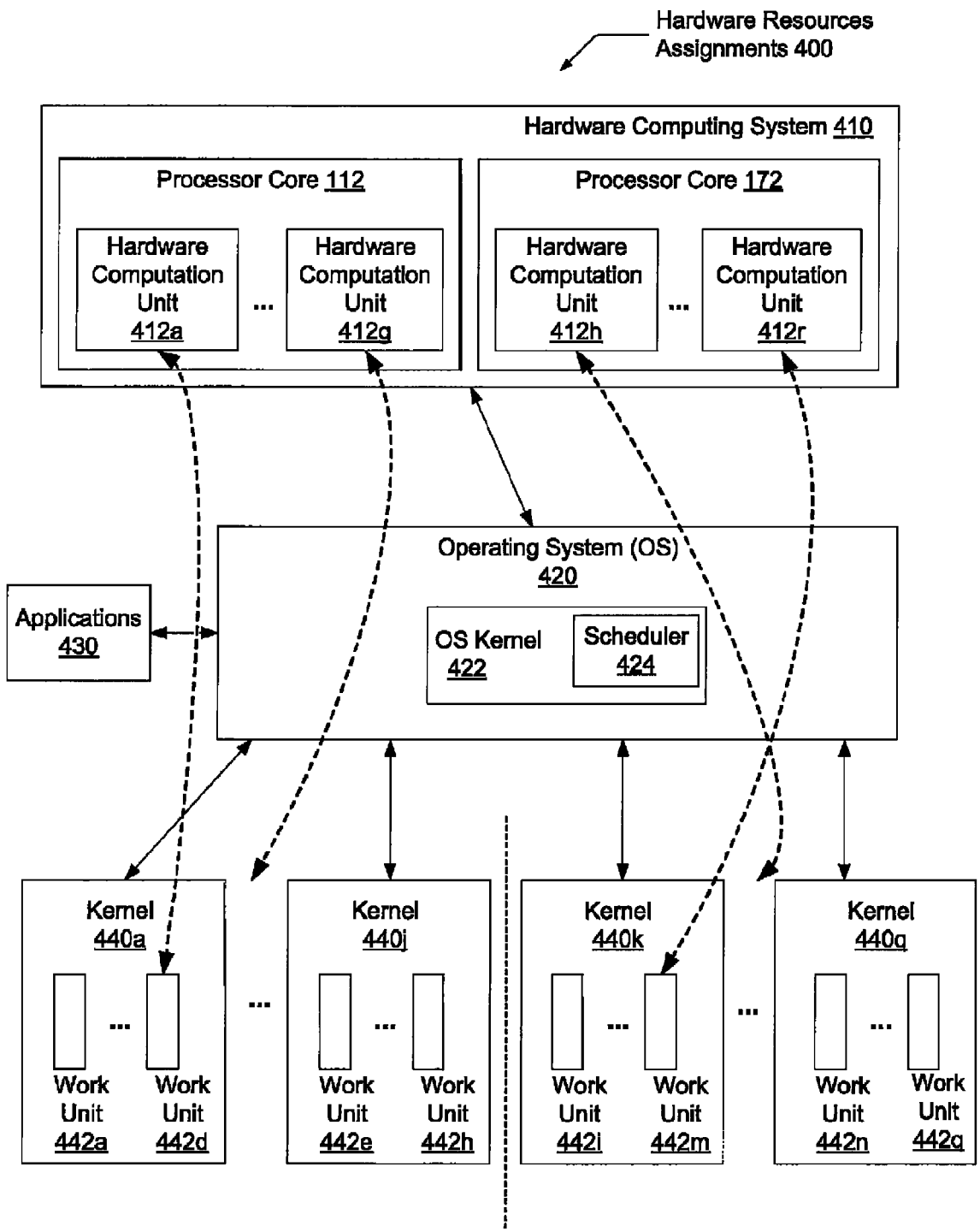
FIG. 4 is a generalized block diagram of one embodiment of the scheduled assignments between hardware resources and compute kernels.

Turning now to FIG. 4, a generalized block diagram illustrating one embodiment of the scheduled assignments 400 between hardware resources and compute kernels is shown. Here, the partitioning of hardware and software resources and their interrelationships and assignments during the execution of one or more software applications 430 is shown. In one embodiment, an operating system 420 allocates regions of memory for compute kernels 440a-440j and 440k-440q. When applications 430, or computer programs, execute, each application may comprise multiple compute kernels. For example, a first executing application may comprise compute kernels 440a-440j and a second executing application may comprise compute kernels 440k-440q. Within each of these compute kernels may be one or more work units. For example, compute kernel 440a comprises work units 442a-442d, compute kernel 440j comprises work units 442e-442h, compute kernel 440k comprises 442j-442m and compute kernel 440q comprises work units 442n-442q. A work unit may execute independently of other work units and execute concurrently with other work units.

Each of the compute kernels shown in FIG. 4 may own its own resources such as an image of memory, or an instance of instructions and data before application execution. Each of the compute kernels may also comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as a set of permissions.

In one embodiment, hardware computing system 410 incorporates a general-purpose processor core 112 and a SIMD processor core 172, each configured to process one or more work units. In another embodiment, system 410 includes two other heterogeneous processor cores. In general, for a given application, operating system 420 sets up an address space for the application, loads the application's code into memory, sets up a stack for the program, branches to a given location inside the application, and begins execution of the application, upon requests from the scheduler. Typically, the portion of the operating system 420 that manages such activities is the operating system (OS) compute kernel 422. The OS compute kernel 422 is referred to as "OS compute kernel" in order not to confuse it with a compute kernel, or a function call. The OS Compute kernel 422 may further determine a course of action when insufficient memory is available for the execution of the application. As stated before, an application may be divided into more than one compute kernel and system 410 may be running more than one application. Therefore, there may be several compute kernels running in parallel. The scheduler, using the OS Compute kernel 422, may decide at any time which of the simultaneous executing compute kernels is allocated to the processor cores 112 and 172. The OS Compute kernel 422 may allow a process to run on a core of a processor, which may have one or more cores, for a given amount of time referred to as a time slice. An scheduler 424 in the operating system 420 may comprise decision logic for assigning compute kernels to cores.

In one embodiment, only one compute kernel can execute at any time on any one of the hardware computation units 412a-412g and 412h-412r. These hardware computation units comprise hardware that can handle the execution of a given instruction of a given work unit with associated data. This hardware may include an arithmetic logic unit that is configured to perform addition, multiplication, zero detect, a bit-wise shift, division, video graphics and multimedia instructions or other operations known to those skilled in the art of processor design. These hardware computation units may include a hardware thread in a multi-threaded processor, a parallel hardware column in a SIMD micro-architecture, and so forth.

The dashed lines in FIG. 4 denote assignments and do not necessarily denote direct physical connections. Thus, for example, hardware computation unit 412a may be assigned to execute work unit 442d. However, later (e.g., after a context switch), the hardware computation unit 412a may be assigned to execute work unit 442h. In one embodiment, the scheduler 424 may schedule the work units 442a-442q to the hardware computation units 412a-412r with a round-robin scheme. Alternatively, the scheduler 424 may schedule the work units 442a-442q to the cores 112 and 172 with a round-robin scheme. An assignment of a given work unit to a given hardware computation unit may be performed by an associated processor core. In another embodiment, the scheduler 424 may perform the scheduling based on availability of the processor cores 112 and 172. In yet another embodiment, the scheduler 424 may perform the scheduling according to assignments created by a programmer utilizing the OpenCL™ API or another similar API. These scheduling schemes may restrict portability and performance when there is a mismatch between the work unit assignments and hardware resources.

Figure 5:
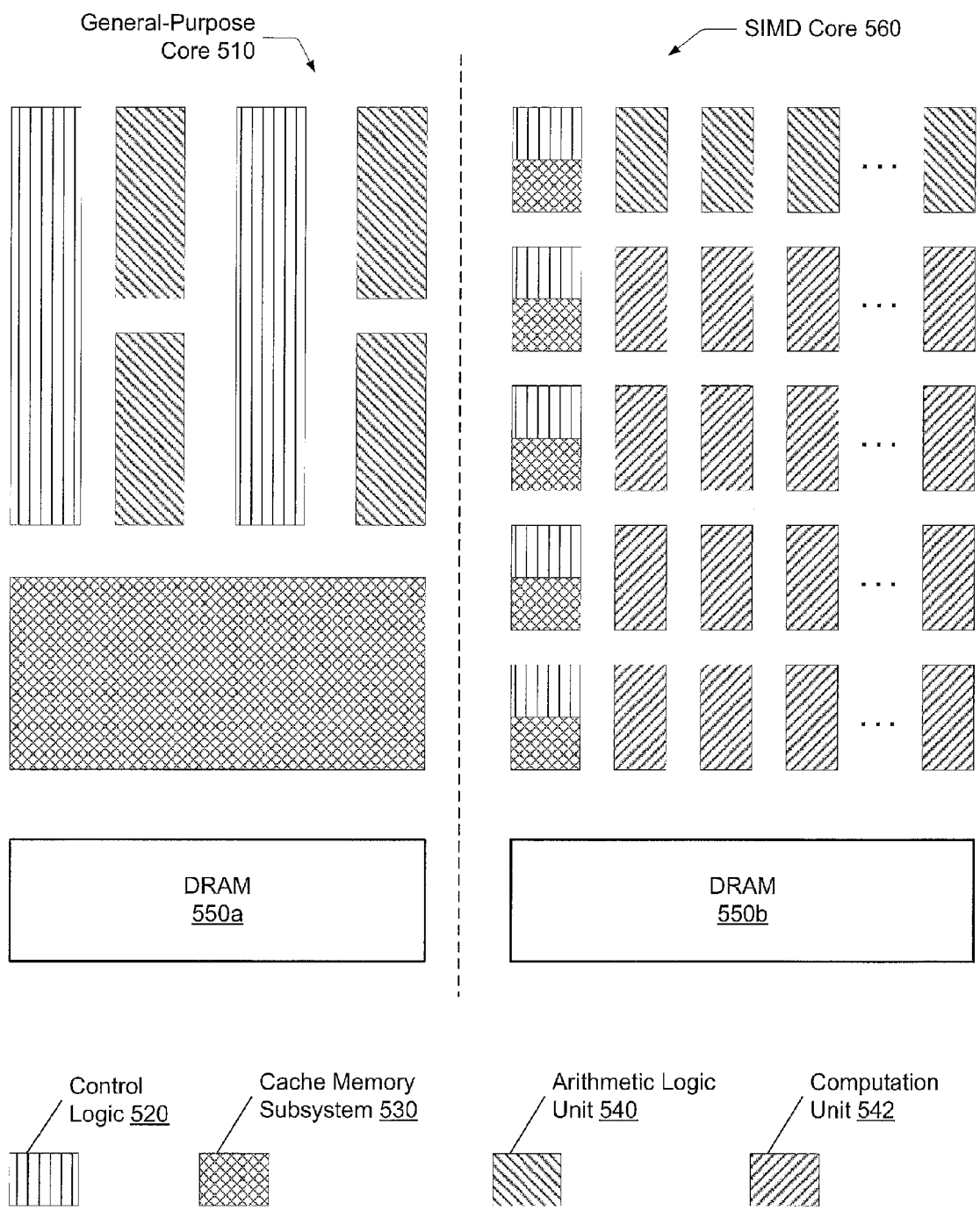
FIG. 5 is a generalized block diagram of one embodiment of a logical layout of micro-architectures for two types of processor cores.

Referring to FIG. 5, a generalized block diagram illustrating one embodiment of a logical layout of micro-architectures for two types of processor cores is shown. Although each of a general-purpose core 510 and a single instruction multiple data (SIMD) core 560 is shown, other types of heterogeneous cores are possible and contemplated. Each of the cores 510 and 560 have a dynamic random access memory (DRAM) 550a and 550b for storage of data and instructions. In one embodiment, the cores 510 and 560 share a same DRAM. In another embodiment, a given level of a cache memory subsystem (not shown) is shared in addition to the DRAM. For example, referring again to FIG. 1, the cache memory subsystem 118 is shared by the cores 112 and 172.

Each of the cores 510 and 560 include a cache memory subsystem 530. As shown, the general-purpose core 510 logically has the cache memory subsystem 530 separate from the control logic 520 and the arithmetic logic units (ALUs) 540. The data flow within the core 510 may be pipelined, although storage elements, such as pipeline registers, are not shown in order to simplify the illustration. In a given pipeline stage, an ALU may be unused if instructions in this stage do not utilize a certain type of ALU or if another work unit (or another thread for a general-purpose core) consumes the ALUs during this stage.

As shown, the SIMD core 560 has the cache memory subsystem 530 grouped with control logic 520 for each row of computation units 542. The data flow within the core 560 may be pipelined, although storage elements, such as pipeline registers, are not shown in order to simplify the illustration. In a given pipeline stage, a computation unit may be unused if an associated instruction in this stage is not executed based on a previous failed test, such as a not-taken branch.

Figure 6:
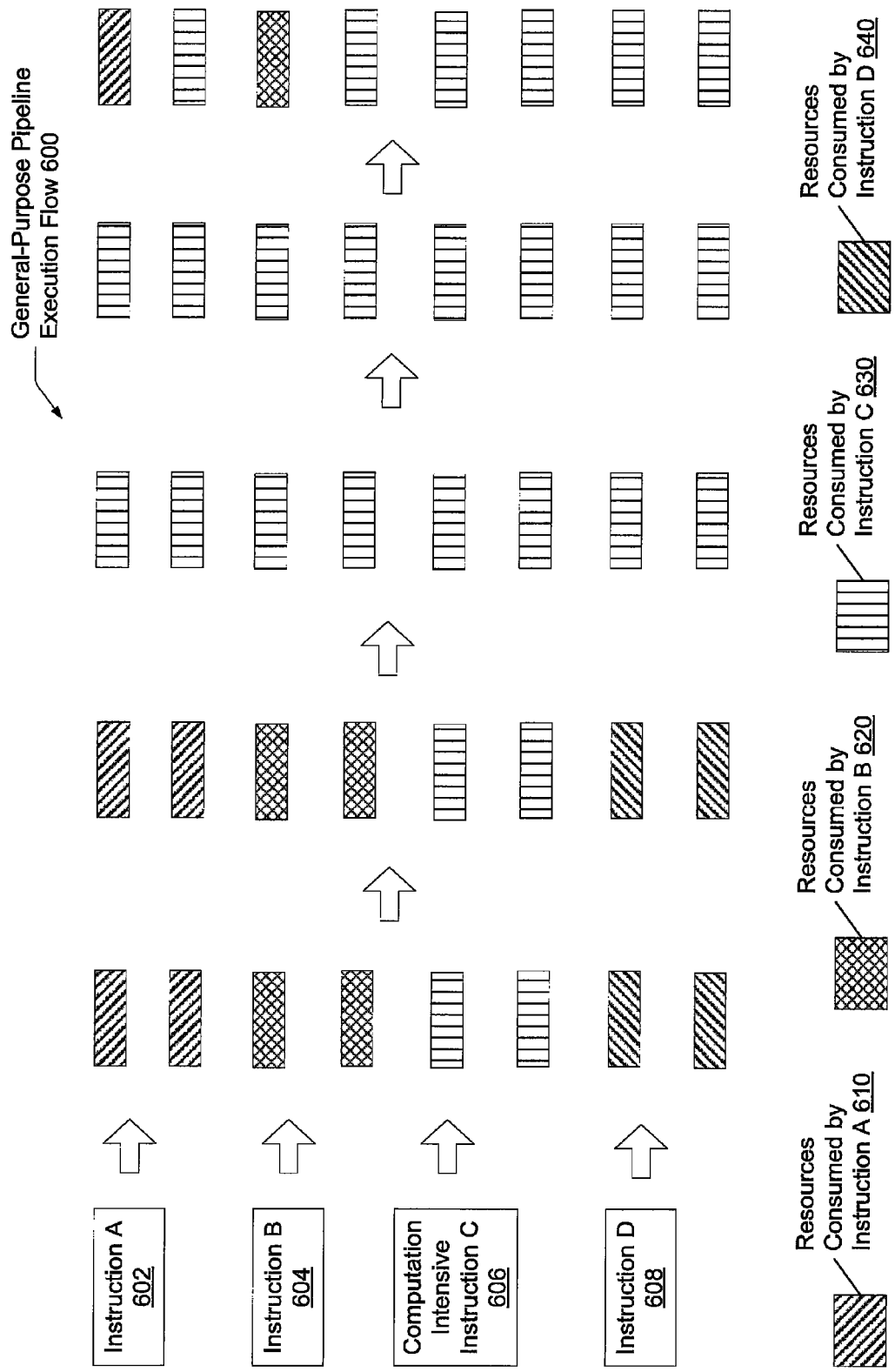
FIG. 6 is a generalized block diagram of one embodiment of a general-purpose pipeline execution flow.

Referring now to FIG. 6, a generalized block diagram illustrating one embodiment of a general-purpose pipeline execution flow 600 is shown. Instructions 602-608 may be fetched and enter a general-purpose pipeline. Instruction 606 may be a computation intensive instruction. During particular stages of the pipeline execution flow, one or more of the instructions 602-608 consume resources in the general-purpose processor core 112, such as decoder logic, instruction scheduler entries, reorder buffer entries, ALUs, register file entries, branch prediction units, and so forth.

In a balanced scheme, each of the instructions 602-608 consume an equal amount of resources each stage. However, typically, a general-purpose core does not replicate resources for each instruction due to real-estate cost, power consumption and other design considerations. Therefore, the workload may become unbalanced. For example, the instruction 606 may consume more resources for one or more pipe stages due to its computation intensive behavior. As shown, the resources 630 consumed by this instruction may become far greater than the resources consumed by other instructions. In fact, the computation intensive instruction may block the usage of hardware resources by other instructions.

Some computation intensive tasks may place pressure on shared resources within the general-purpose core 112. Thus, throughput losses occur for both the computational intensive process and other processes waiting for the shared resources. In addition, some instructions occupy the shared resource and other resources on the die to support the computation being performed on the shared resource. Such a long latency instruction may concurrently block other processes from using several resources during a long latency.

Figure 7:
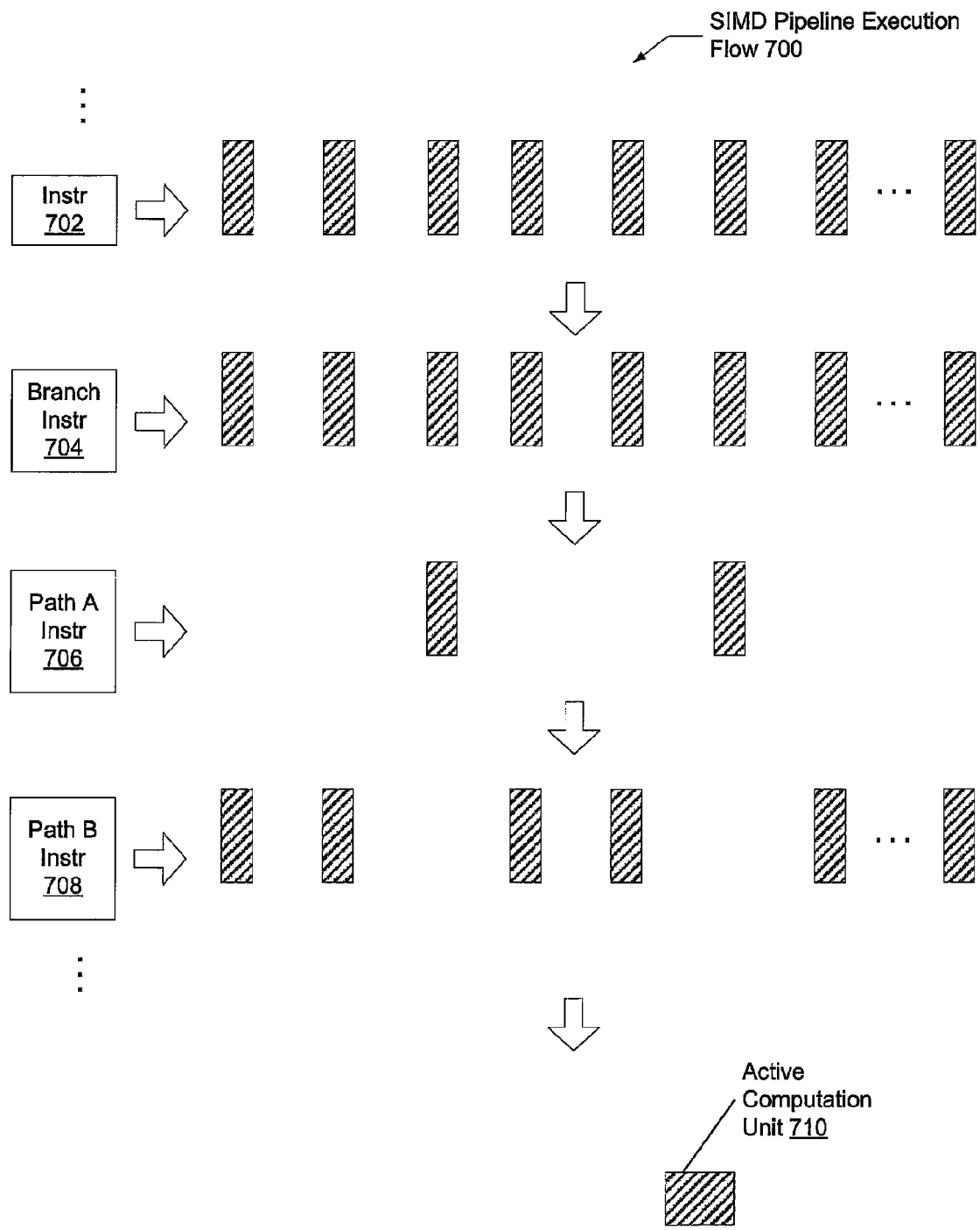
FIG. 7 is a generalized block diagram of one embodiment of a SIMD pipeline execution flow.

Referring now to FIG. 7, a generalized block diagram illustrating one embodiment of a SIMD pipeline execution flow 700 is shown. Instructions 702-708 may be fetched and enter a SIMD pipeline with associated data. Instruction 704 may be a control flow transfer instruction, such as a branch. The instruction 706 may be a first instruction in a taken path. For example, the branch instruction 704 may be associated with an IF statement in a high-level language program. The instruction 706 may be associated with a THEN statement in the high-level language program. The instruction 708 may be a first instruction in a not-taken path. The instruction 708 may be associated with an ELSE statement in the high-level language program.

Each of the computation units within a given row may be a same computation unit. Each of these computation units may operate on a same instruction, but different data associated with a different work unit. As shown, some of the work units pass the test provided by the branch instruction 704 and other work units fail the test. The SIMD core 172 may execute each of the available paths and selectively disable the execution units, such as the computation units, corresponding to work items that did not choose the current path. For example, during execution of an If-Then-Else construct statement, within each column of a SIMD architecture are execution units configured to execute the "Then" (Path A) and the "Else" (Path B) paths. The efficiency of parallel execution may be reduced as the first and the second work units halt execution and wait as the third work unit continues with its ongoing execution. Therefore, not all of the computation units are active computation units 710 in a given row after execution of the branch instruction 704. If a large number of computation units are inactive during a given pipe stage, the efficiency and throughput of the SIMD core is reduced.

Figure 8:
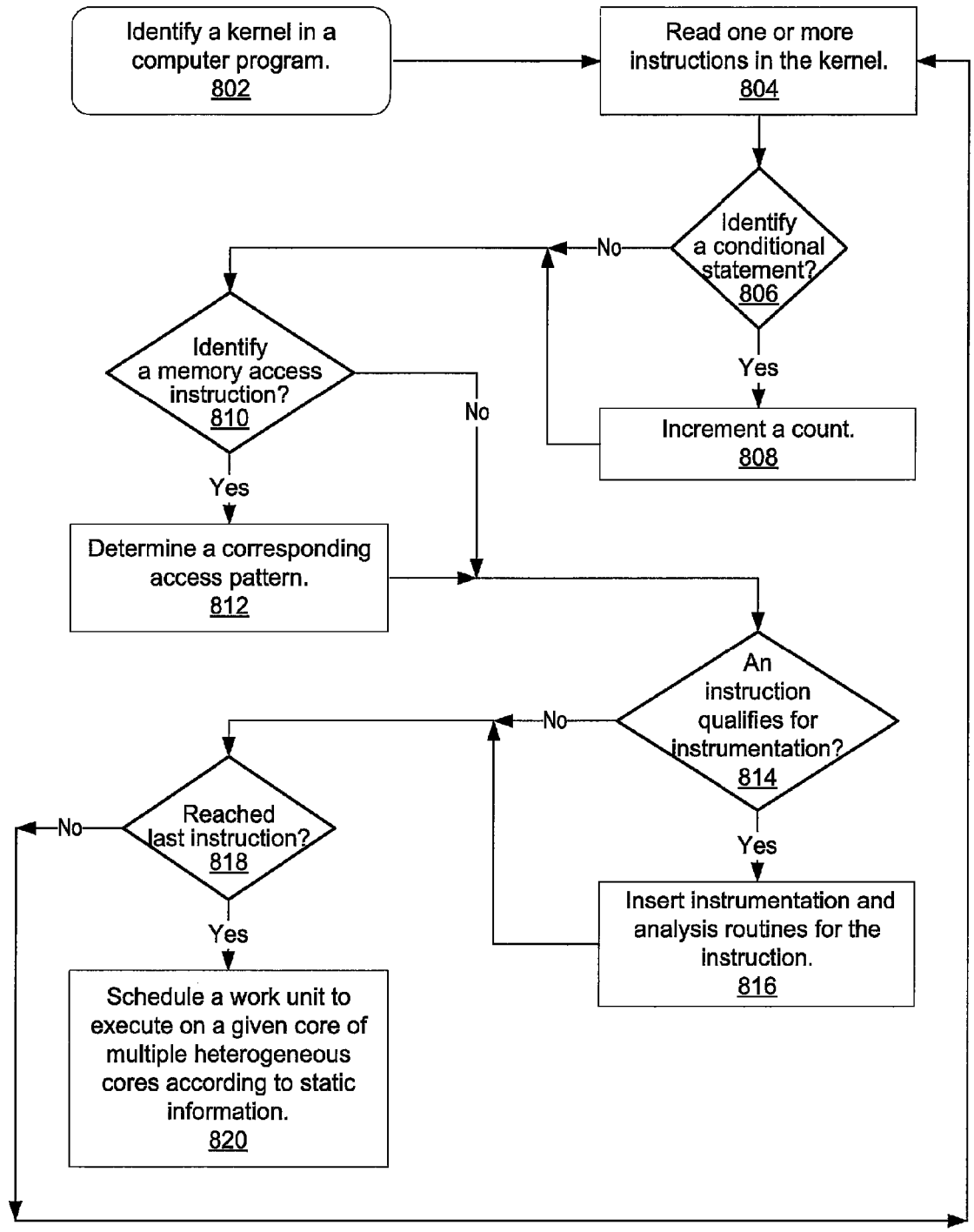
FIG. 8 is a generalized flow diagram illustrating one embodiment of a method for scheduling work units to processor cores utilizing static information.

Turning now to FIG. 8, one embodiment of a method 800 for scheduling work units to processor cores utilizing static information is shown. The components embodied in the processing node 110 and the hardware resource assignments shown in FIG. 4 described above may generally operate in accordance with method 800. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 802, a software program or subroutine may be located and analyzed. This software program may be written for compilation and execution on a heterogeneous architecture. Program code may refer to any portion of a software application, subroutine, dynamic linked library, or otherwise. A pathname may be entered at a command prompt by a user, a pathname may be read from a given directory location, or other, in order to begin compiling the source code. The program code may be written by a designer in a high-level language such as C, a C-like language such as OpenCL™, and so forth. In one embodiment, the source code is statically compiled. In such an embodiment, during a static front-end compilation, the source code may be translated to an intermediate representation (IR). A back-end compilation step may translate the IR to machine code. The static back-end compilation may perform more transformations and optimizations. The compiler may identify a kernel in the program code.

In block 804, the compiler may read one or more instructions of the kernel and analyze them. If a conditional statement is identified (conditional block 806), then in block 808, a count of a number of conditional statements may be incremented. The conditional statement may be a control flow transfer instruction, such as a branch. In one embodiment, separate counts may be maintained for different types of control flow transfer instructions such as forward/backward branches, direct/indirect branches, jumps, and so forth. It may be possible for a compiler or other tool to statically determine a direction of a branch, a target of a branch or an address of a memory access operation. However, in one embodiment, some processing typically performed during runtime on associated data may be performed during compilation. For example, a simple test to determine a direction (taken, not-taken) of a branch may be performed. Although, compilation may be referred to as "static compilation", one or more small dynamic operations may be performed. This compilation may also be referred to as "pre-runtime compilation". Another example of a dynamic step performed at this time is identifying a next instruction to execute in each of a THEN, ELSEIF and ELSE blocks of an If-Then-ElseIf-Else construct.

If a memory access instruction is identified (conditional block 810), then in block 812, a corresponding access pattern may be determined. Memory accesses may be sequential, stride, direct, indirect, gather in groups, scattered and so forth. Again, some dynamic computation may be performed with data associated with a work unit during compilation. The compiler may maintain counts of different categories of memory accesses.

In one embodiment, prior to code execution, static binary instrumentation may be performed. An instruction may be inspected in order to determine whether the instruction qualifies for instrumentation. Instrumentation allows measuring and error-checking analysis to be performed in subsequent execution by analysis routines. In addition, profiling data may be collected. An application's performance may be increased based on an understanding of the dynamic behavior of the resulting work units such as a memory profile. In addition, dynamic scheduling of work units based on the dynamic behavior of completed work units derived from a same kernel may be performed. The use of static compile time control flow graphs and data flow graphs may be used to detect initialized variables and program behavior prior to runtime execution.

However, the dynamic behavior may provide further information. Therefore, at least control flow transfer instructions and memory access instructions, such as load/read and store/write operations, may be instrumented. However, in order to reduce an amount of measurement data to store and analysis to perform, filtering may be used to reduce the number of instrumented instructions even when a given instruction otherwise qualifies for instrumentation.

If an instruction does qualify for instrumentation (conditional block 814), then in block 816, during an instrumentation stage, analysis routines may be placed in-line or reside in a function call, wherein the function name is placed in-line within the code either before or after the qualified instruction to be instrumented. If the last instruction is reached (conditional block 818), then in block 820, the scheduler schedules each work unit to execute on a corresponding one of the cores 112 and 172 within a heterogeneous architecture according to the pre-runtime, or static, information.

The scheduler 424 used in a heterogeneous multi-core architecture may place priority on a match between the hardware resources and organization within a core and the characteristics of a work unit. For example, the work units corresponding to a kernel with low thread-level parallelism may be scheduled on the general-purpose processor core 112.

A work unit with a number of control flow transfer instructions greater than a given threshold may be scheduled on core 112. Alternatively, the work units of a kernel comprising a relatively high number of control flow instructions with varying directions based on associated data may be scheduled on core 112. For example, if a kernel has a high number of control flow transfer instructions, but the direction (taken, not-taken) is consistent among a high number of work units, then the work units may be scheduled on the SIMD core 172. Otherwise, if the directions of the control flow transfer instructions are inconsistent, or varying, then the associated work units may be scheduled on core 112.

If a relatively high number of memory access instructions perform accesses of memory locations in a sequential manner or a stride manner, then the corresponding work units may be scheduled on the SIMD core 172. If a relatively high number of memory access instructions perform accesses of memory locations in a scattered or indirect manner, then the corresponding work units may be scheduled on the general-purpose core 112. At run time the OpenCL™ compiler may generate multiple versions of kernels for each OpenCL™ device type, such as the general-purpose core 112 and the SIMD core 172. In one example, the scheduler 424 may schedule the first 256 work units of a given kernel to execute on the SIMD core 172. However, based on the monitored dynamic behavior of those work units, the scheduler 424 may schedule the last 16 work units of the given kernel to the general-purpose core 112.

Figure 9:
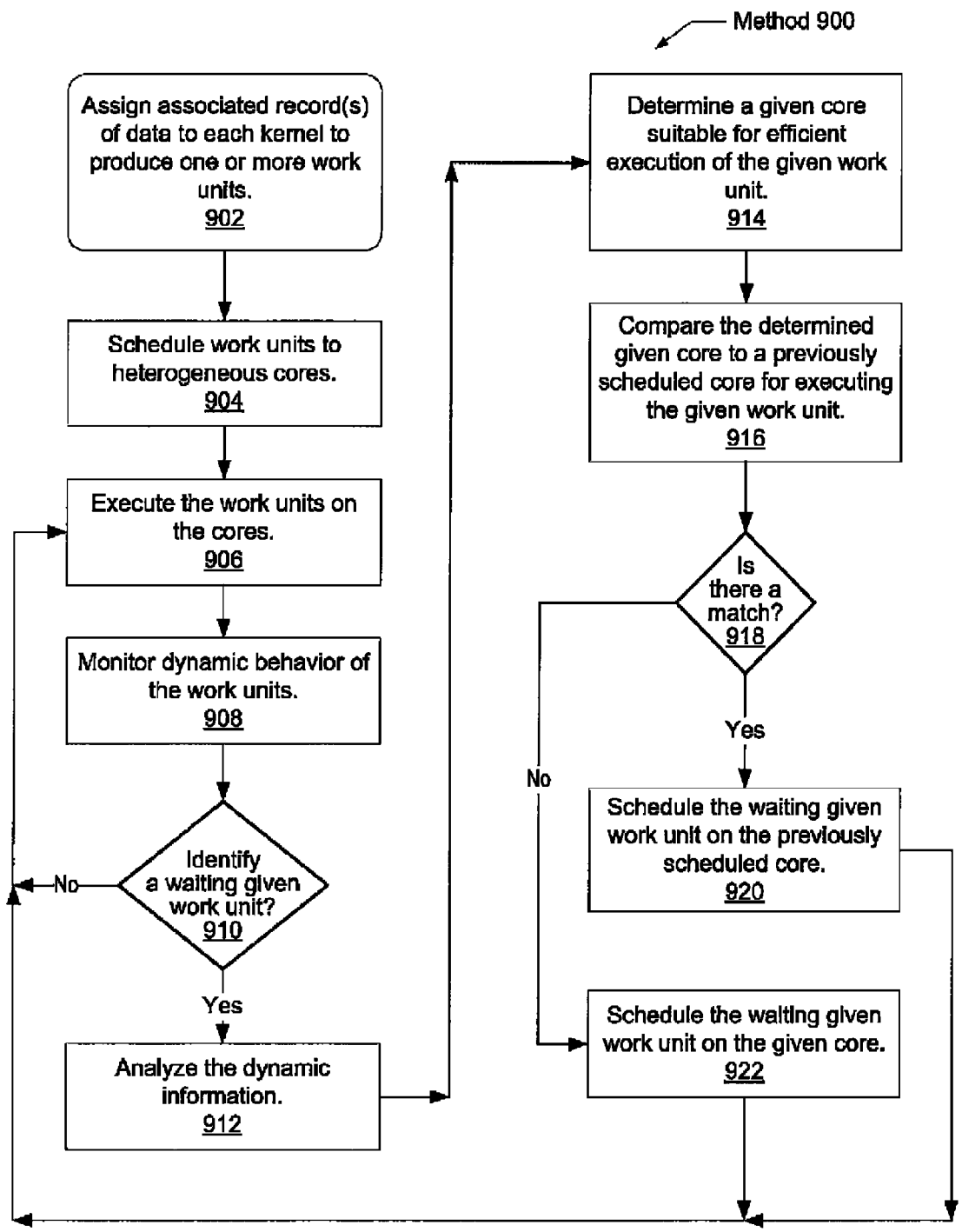
FIG. 9 is a generalized flow diagram illustrating one embodiment of a method for scheduling work units to processor cores utilizing dynamic information While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents.

Turning now to FIG. 9, one embodiment of a method 900 for scheduling work units to processor cores utilizing dynamic information is shown. The components embodied in the processing node 110 and the hardware resource assignments shown in FIG. 4 described above may generally operate in accordance with method 900. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 902, an associated record of data is assigned to each work unit of a given kernel. In block 904, the scheduler 424 schedules the work units to heterogeneous cores. The method 700 may be used to perform the scheduling. In block 906, the processor cores 112 and 172 execute the corresponding scheduled work units. In block 908, instrumentation code and tools monitor and collect the dynamic behavior of the executing work units. The collected data may be stored in one or more tables. Entries of the one or more tables may utilize a processor core identifier (ID), a kernel ID and a work unit ID to indicate the current system topology being measured.

An event index may indicate a type of event being measured by the instrumented code. An actual measured value may be stored along with a rate value. The rate may include a corresponding frequency or percentage measurement. A status field may be used to indicate whether the measured value and rate value are valid. One or more configurable threshold values may be stored. In one embodiment, these threshold values are programmable.

If a scheduled work unit is waiting to be executed (conditional block 910), then in block 912, the monitored dynamic behavior of any executing work units corresponding to the same kernel may be analyzed. In block 914, one of the heterogeneous cores is determined to be suitable for efficient execution of the given work unit. For example, as a number of instructions per work unit increases, there is a higher chance the instructions correspond to general-purpose functionality. Therefore, when the measured number passes a given threshold, the general-purpose core 112 may be more suitable for execution of the waiting work unit. Additionally, a count of instructions between taken branches may be used.

A given loop in the code and a number of loops may indicate efficient execution with a SIMD micro-architecture. A number of executed branches and other types of control flow transfer instructions beyond a given threshold may indicate the general-purpose core 112 offers more efficient execution. Similarly, a relatively high number of cache misses may indicate the general-purpose core 112 may be more efficient than the SIMD core 172 for execution of the work unit. A relatively high number of executed floating-point operations, executed graphics processing operations, and pipeline stalls due to write buffer overflow may indicate the SIMD core 172 offers more efficient execution for the waiting work unit. Also, an execution time to determine the preferred OpenCL™ device type to execute the waiting work unit may be used. Other runtime criteria are possible and contemplated. In addition, each of the criteria may have associated weights used in a summing formula of all the criteria to determine the preferred OpenCL™ device type for execution.

In block 916, a comparison is made between the processor core determined above for efficient execution of the waiting work unit and a previously scheduled processor core. If there is a match (conditional block 918), then in block 920, the scheduler 424 schedules the waiting work unit on the previously scheduled processor core. If there is not a match (conditional block 918), then in block 922, the scheduler 424 schedules the waiting work unit on the processor core found from the above analysis utilizing dynamic behavior of a corresponding kernel.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool which may synthesize the description to produce a netlist comprising a list of gates from a synthesis library. The netlist comprises a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for scheduling work units in a heterogeneous multi-core architecture comprising:
   scheduling a first compute kernel to a first processor core of a plurality of processor cores based at least in part on pre-runtime static information determined during compilation of the first compute kernel that indicates the first compute kernel includes a number of branch instructions less than a first threshold, wherein the first processor core has a first micro-architecture;
   scheduling the first compute kernel to a second processor core of a plurality of processor cores based at least in part on the pre-runtime static information that indicates the number of branch instructions is greater than the first threshold, wherein the second processor core has a second micro-architecture;
   receiving measured runtime information corresponding to runtime behavior of the first compute kernel on the first or second processor core; and
   rescheduling the first compute kernel from the first processor core to the second processor core of the plurality of processor cores based at least in part on the measured runtime information indicating a number of branch instructions executed is greater than a second threshold number.

2. The method as recited in claim 1, further comprising, during compilation of the first compute kernel, generating a different version of binary code for the first compute kernel for each of the first and the second processor cores.

3. The method as recited in claim 1, wherein the first micro-architecture is a single instruction multiple data (SIMD) micro-architecture.

4. The method as recited in claim 1, wherein said scheduling comprises:
   determining a second compute kernel includes a first number of instructions with scattered or indirect memory accesses;
   determining the second compute kernel includes a second number of instructions with sequential or stride memory accesses;
   scheduling the second compute kernel to the second processor core, in response to determining said first number of instructions is greater than the second number of instructions; and
   scheduling the second compute kernel to the first processor core, in response to determining said first number of instructions is not greater than the second number of instructions.

5. The method as recited in claim 1, further comprising:
   scheduling a second compute kernel to the second processor core of the plurality of processor cores based at least in part on pre-runtime static information determined during compilation of the second compute kernel that indicates the second compute kernel includes less than a third threshold number of instructions of a second type corresponding to at least one of the following: cryptographic, floating-point, garbage collection and video grahics;
   rescheduling the second compute kernel from the second processor core to the first processor core based at least in part on measured runtime information that indicates at least a fourth threshold number of instructions of the second type have been executed, wherein the first micro-architecture is a single instruction multiple data (SIMD) micro-architecture.

6. The method as recited in claim 5, wherein said scheduling comprises scheduling the first compute kernel to the first processor core based at least in part on memory accesses included within the first compute kernel.

7. A computing system including a heterogeneous multi-core architecture comprising:
   a first processor core with a first micro-architecture;
   a second processor core with a second micro-architecture different from the first micro-architecture;
   an operating system comprising a scheduler, wherein the scheduler is configured to:
      schedule a first compute kernel to the first processor core based at least in part on pre-runtime static information determined during compilation of the first compute kernel, said pre-runtime static information indicating that the first compute kernel includes a number of branch instructions less than a first threshold;
      schedule the first compute kernel to a second processor core of a plurality of processor cores based at least in part on the pre-runtime static information that indicates the number of branch instructions is greater than the first threshold;

receive measured runtime information corresponding to runtime behavior of the first or second compute kernel on the first processor core; and reschedule the first compute kernel from the first processor core to the second processor core based at least in part on the measured runtime information indicating a number of branch instructions executed is greater than a second threshold number.

8. The computing system as recited in claim 7, wherein, during compilation of the first compute kernel, the compiler is further configured to generate a different version of binary code for the first compute kernel for each of the first and the second processor cores.

9. The computing system as recited in claim 7, wherein the first micro-architecture is a single instruction multiple data (SIMD) micro-architecture.

10. The computing system as recited in claim 9, wherein to perform said scheduling, the scheduler is further configured to:

determine a second compute kernel includes a first number of instructions with scattered or indirect memory accesses;

determine the second compute kernel includes a second number of instructions with sequential or stride memory accesses;

schedule the second compute kernel to the second processor core, in response to determining said first number of instructions is greater than the second number of instructions; and schedule the second compute kernel to the first processor core, in response to determining said first number of instructions is not greater than the second number of instructions.

11. The computing system as recited in claim 7, wherein the scheduler is configured to:

schedule a second compute kernel to the second processor core of the plurality of processor cores based at least in part on pre-runtime static information determined during compilation of the second compute kernel that indicates the second compute kernel includes less than a third threshold number of instructions of a second type corresponding to at least one of the following: cryptographic, floating-point, garage collection and video graphics;

reschedule the second compute kernel from the second processor core to the first processor core based at least in part on measured runtime information indicating at least a fourth threshold number of instructions of the second type have been executed, the first micro-architecture is a single instruction multiple data (SIMD) micro-architecture.

12. The computing system as recited in claim 11, wherein said scheduling comprises scheduling the first compute kernel to the first processor core based at least in part on memory accesses included within the first compute kernel.

13. A non-transitory computer readable storage medium storing program instructions configured to schedule compute kernels in a heterogeneous multi-core architecture, wherein the program instructions are executable to:

schedule a first compute kernel to a first processor core of a plurality of processor cores based at least in part on pre-runtime static information determined during compilation of the first compute kernel that indicates the first compute kernel includes a number of branch instructions less than a first threshold, wherein the first processor core has a first micro-architecture;

schedule the first compute kernel to a second processor core of a plurality of processor cores based at least in part on the pre-runtime static information that indicates the number of branch instructions is greater than the first threshold, wherein the second processor core has a second micro-architecture;

receive measured runtime information corresponding to runtime behavior of the first compute kernel on the first or second processor core; and reschedule the first compute kernel from the first processor core to the second processor core of the plurality of processor cores based at least in part on the received runtime information indicating a number of branch instructions executed is greater than a second threshold number.

14. The non-transitory computer readable storage medium as recited in claim 13, wherein the first micro-architecture is a single instruction multiple data (SIMD) micro-architecture.

15. The non-transitory computer readable storage medium as recited in claim 14, wherein to perform said scheduling, the program instructions are further executable to:

determine a second compute kernel includes a first number of instructions with scattered or indirect memory accesses;

determine the second compute kernel includes a second number of instructions with sequential or stride memory accesses;

schedule the second compute kernel to the second processor core, in response to determining said first number of instructions is greater than the second number of instructions; and schedule the second compute kernel to the first processor core, in response to determining said first number of instructions is not greater than the second number of instructions.

* * * * *

UNITED STATES PATENT AND TRADEMARK OFFICE
CERTIFICATE OF CORRECTION

| | | |
|---|---|---|
| PATENT NO. | : 8,782,645 B2 | Page 1 of 1 |
| APPLICATION NO. | : 13/105250 | |
| DATED | : July 15, 2014 | |
| INVENTOR(S) | : Breternitz et al. | |

It is certified that error appears in the above-identified patent and that said Letters Patent is hereby corrected as shown below:

In the Claims:

Column 15, Claim 11, Line 43, please delete "garage" and substitute -- garbage --.

Signed and Sealed this
Sixteenth Day of September, 2014

Michelle K. Lee
*Deputy Director of the United States Patent and Trademark Office*